United States Patent [19]
Lane et al.

[11] 3,843,982
[45] Oct. 29, 1974

[54] WINDSHIELD STRUCTURE

[75] Inventors: Marvin Lane; E. Thomas Willard, both of Waxachachie, Tex.

[73] Assignee: Nelson A. Taylor Co., Gloversville, N.Y.

[22] Filed: Oct. 8, 1971

[21] Appl. No.: 187,810

Related U.S. Application Data

[63] Continuation-in-part of Ser. No. 150,555, June 7, 1971, abandoned.

[52] U.S. Cl. ............. 9/1 R, 244/129 W, 296/84 R, 49/DIG. 2, 156/107, 160/371, 161/44
[51] Int. Cl. ......................................... B63b 17/00
[58] Field of Search ............... 9/1 R, 400; 114/.5 R; 244/121, 129 W, 129 R, 117 R; 296/84 R, 84 C, 92, 86, 87, 90, 31 P; 52/309, 172, 208, 400; 160/371; 49/DIG. 2, 413; 264/45, 275; 161/44, 45, 145, 192; 156/107

[56] References Cited
UNITED STATES PATENTS

| | | | |
|---|---|---|---|
| 2,304,984 | 12/1942 | Wood | 264/275 |
| 2,388,786 | 11/1945 | Knight et al. | 52/208 |
| 2,537,804 | 1/1951 | Watkins | 156/107 |
| 2,733,789 | 2/1956 | Tolle | 161/45 |
| 2,836,140 | 5/1958 | Hunt, Jr. | 9/1 R X |
| 2,973,220 | 2/1961 | White | 9/6 X |
| 3,016,548 | 1/1962 | Taylor | 9/1 R |
| 3,021,535 | 2/1962 | Dorst | 9/1 R |
| 3,121,889 | 2/1964 | Gentile | 9/1 X |
| 3,174,792 | 3/1965 | Demas | 296/87 |
| 3,183,285 | 5/1965 | Boylan | 264/45 |
| 3,304,657 | 2/1967 | Singleton | 9/1 R |
| 3,494,086 | 2/1970 | Prusinski et al. | 52/309 |
| 3,605,341 | 9/1971 | Puckett | 49/413 |

Primary Examiner—Trygve M. Blix
Assistant Examiner—Edward Kazenske
Attorney, Agent, or Firm—Bierman & Bierman

[57] ABSTRACT

A boat windshield which consists of one or more panels each consisting of a pane of rigid or semi-rigid transparent material, the perimeter of which is surrounded by and fixed in a rigid one-piece frame member of plastic material. The plastic frame member is molded about the periphery of the pane. Panel guide members may be embedded in the plastic frame and also hinged elements to produce a windshield structure consisting of a plurality of panels.

9 Claims, 10 Drawing Figures

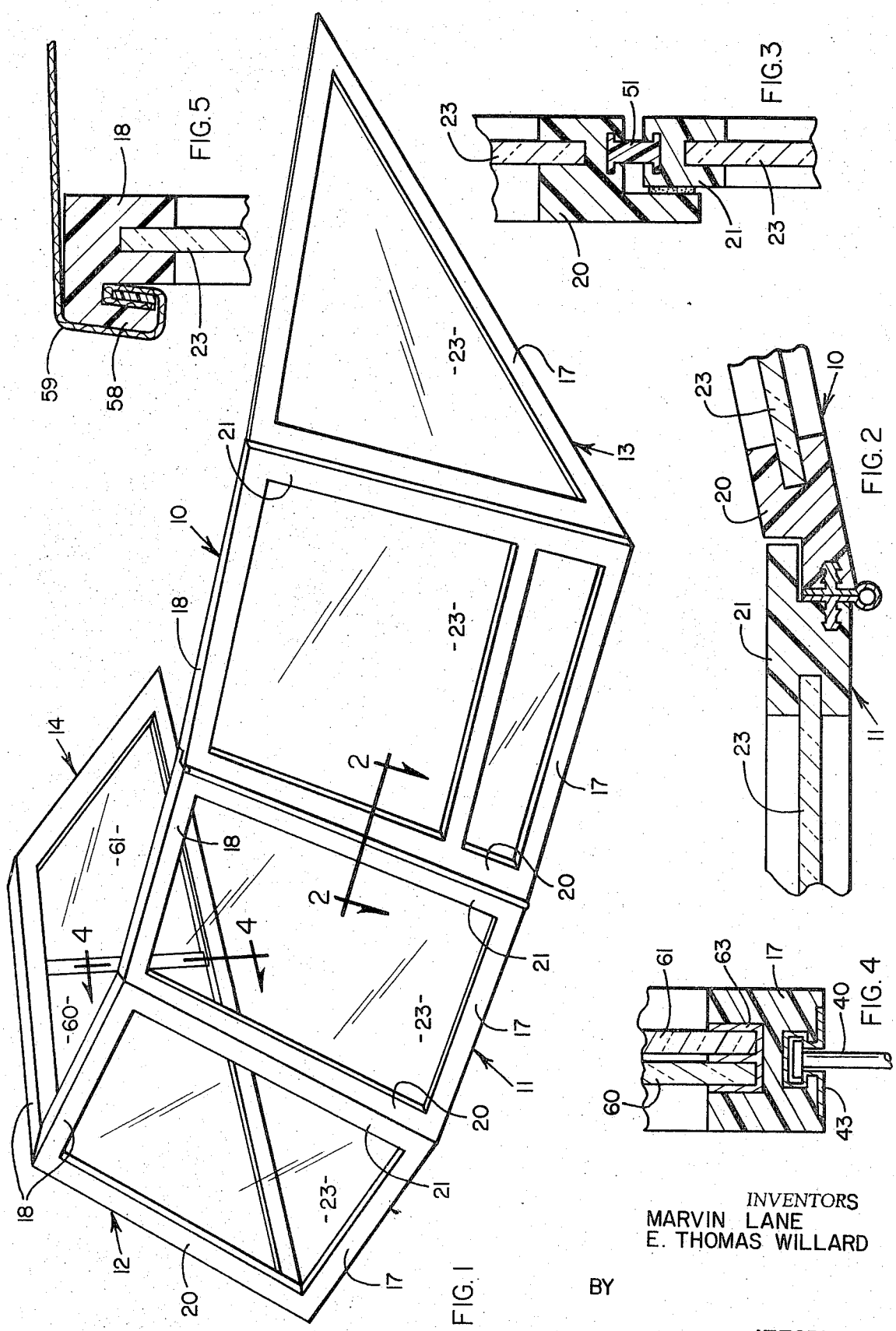

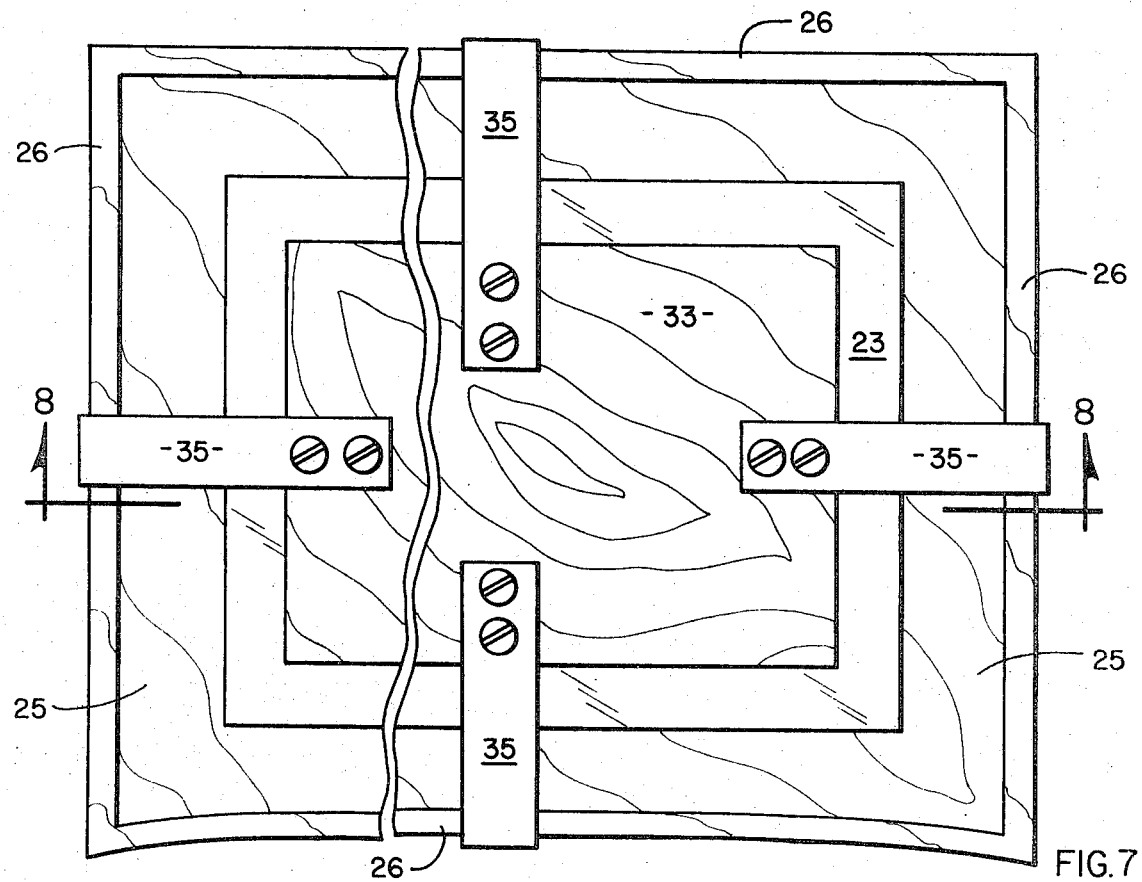
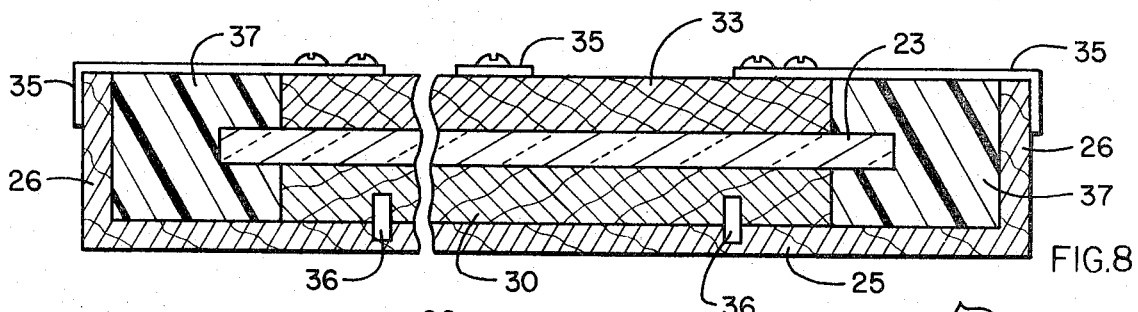
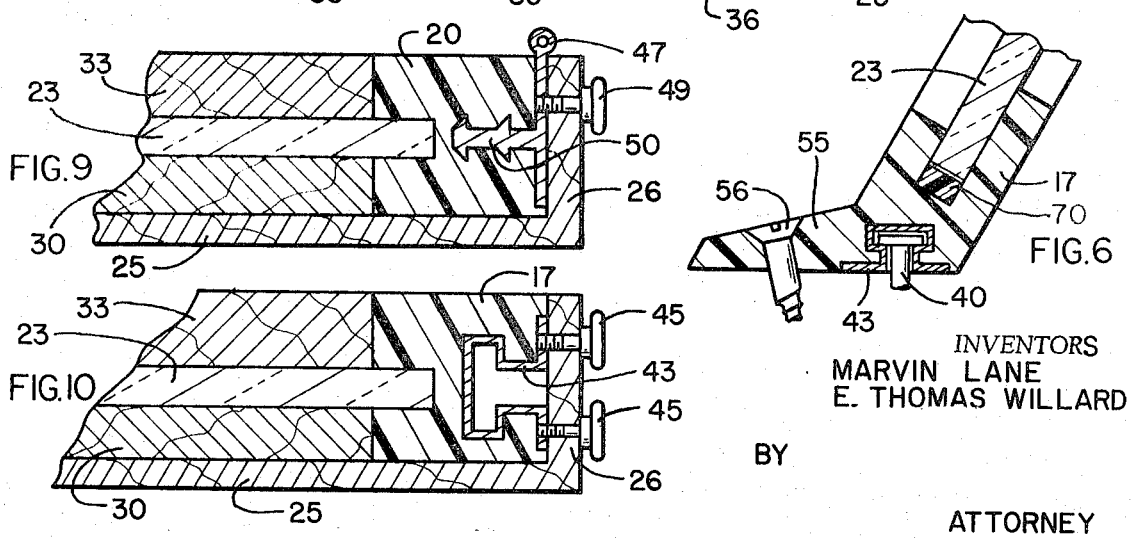
INVENTORS
MARVIN LANE
E. THOMAS WILLARD

WINDSHIELD STRUCTURE

BACKGROUND OF THE INVENTION

This application is a continuation in part of application Ser. No. 150,555 filed June 7, 1971 now abandoned.

At the present time it is conventional practice to form boat windshields with a metallic frame in which is mounted a transparent pane such as tempered glass or plexiglas. The metallic extrusions are expensive and considerable labor is involved in fabricating the windshield frame from the metallic extrusions and embedding the pane therein in gasket material such as vinyl. This invention has as an object, a windshield structure particularly adaptable for use on boats and the like recreational vehicles wherein the peripheral marginal efge of the pane is surrounded by a plastic frame which is cast and molded on to the pane. The mold is of relatively simple construction and can be formed to produce any desirable configuration or design to the windshield.

BRIEF DESCRIPTION OF THE DRAWINGS

FIG. 1 is an isometric view of a windshield structure embodying our invention, the structure including wing panels;

FIG. 2 is a view taken on line II—II of FIG. 1;

FIG. 3 is a view similar to FIG. 2 illustrating a modified form of hinge;

FIG. 4 is a view taken on line IV—IV of FIG. 1;

FIG. 5 is a view illustrating the top rail formed with trim strip for attachment of the top to the windshield;

FIG. 6 is a view of a modified form of the bottom rail illustrating the placement of a gasket of resilient material;

FIG. 7 is a plan view of a form or mold for casting a frame member;

FIG. 8 is a sectional view taken on line VIII—VIII of FIG. 7;

FIG. 9 is a fragmentary sectional view illustrating the manner of molding a hinge leaf in a side rail of the frame; and FIG. 10 is a view similar to FIG. 9 showing a T slot insert molded in the frame.

DESCRIPTION OF THE PREFERRED EMBODIMENT

Referring to FIG. 1, the windshield is illustrated as having three front panels 10, 11, 12 and a pair of side panels 13, 14. The front panels 10, 11, and 12 are shown as of rectangular form. The side panel 13 is shown as of triangular configuration and the side panel 14 of trapezoidal form. The front panels include bottom and top rails 17, 18, and side rails 20, 21. The windshield frames consisting of the bottom, top and side rails 17, 18, 20, 21 are formed of moldable plastic material. The transparent pane 23 is supported in upwardly spaced relation from a flat mold surface. The plastic material is poured into the mold and cast about the periphery of the pane.

FIG. 6 illustrates a particularly preferred embodiment wherein a gasket of resilient material 70, such as vinyl foam, is placed between the windshield 23 and the frame 17. This resilient material compensates for the differences in the coefficients of expansion between the windshield and the plastic frame as the environmental temperature changes during use. This will prevent cracking during wide temperature variations.

Referring to FIGS. 7 and 8, the mold may consist of a flat oval bottom 25 having upstanding side walls 26. A spacing block 30 is positioned on the bottom wall 25. The transparent pane 23 is positioned on the block 30, with a marginal edge area of the pane extending outwardly from the periphery of the block 30, see FIG. 8. An upper block 33 is positioned on the pane and is oriented complementary to the lower block 30 as by positioning straps 35. The lower block may be flexed to the bottom 25, or oriented by dowel pins 36. The plastic material is poured into the space between the periphery of the blocks 30, 33 and the side walls 26 of the mold. In this manner, the peripheral margin of the pane 23 is encapsulated in the plastic material as indicated at 37, FIG. 8.

The lower frame rails 17 may be formed with T-slots to receive T bolts 40 as shown in FIG. 6 to clamp the frame to the boat structure. The T-slots are conveniently formed in the rails 17 by the employment of a T-slot member 43, formed of thin sheet metal. The form 43 is oriented against a side wall 26 of the mold by removable screws 45. After the plastic material is cast about the periphery of the pane 26 and has solidified, the screws 45 are removed and the cast frame is removed from the mold. The T-slot strip is embedded in the bottom rail 17.

In like manner, a hinge leaf 47 may be temporarily attached to a side wall 26 of a mold by removable screw 49. The hinge leaf 47 is formed with barbs 50 extending into the area in which the plastic material 37 is cast to provide the window frames with hinged mechanism, for pivotally joining the frame 10 to the frame 11 in FIG. 1. Referring to FIG. 3, the hinge is in the form of a flexible plastic member 51, the hands of which are embedded in the frame side rails 20.

In addition to, or in lieu of, the T-bolt arrangement for fixing the frame to the boat or vehicle, the bottom rails 17 may be formed with flanges 55 apertured to receive hold-down screws 56, see FIG. 6. As shown in FIG. 5, the top rail 18 may be formed with a flange 58 extending in outwardly spaced parallel relation to the rail, forming a slot for receiving the forward end edge of the top 59.

A frame may contain two or more panes, each of which is slidable past the other to provide an opening. In FIG. 1, the wing panel 14 is provided with sliding panes 60, 61. In this arrangement, the upper and lower rails 17, 18 have guide strips 63 embedded therein.

The windshield structure embodying our invention is of light weight, durable and not subject to corrosion. The frame may be molded at low cost from pigmented plastic material to produce any desired color scheme.

We claim:

1. A boat windshield structure comprising one or more panes made solely of transparent material, said pane having a rigid and endless plastic one-piece U-shaped frame directly molded on the entire periphery thereof, and means mounted within the confines of said frame for connecting the U-shaped frame of one pane to the boat structure or to the frame of another pane.

2. A Windshield structure as set forth in claim 1 wherein one side of each said frame is provided with a hinge element having a portion embedded in said plastic material.

3. A windshield structure as set forth in claim 1 wherein a pane receiving guide member is embedded in opposite sides of each said frame member, said guide members being formed with channels extending in spaced, parallel relation, the open sides of each said channels in one side of said frame being in confronted relation to the open sides of said channels in the opposite sides of each said frame.

4. A windshield structure as set forth in claim 1 wherein one side of each said frame is formed in the outer edge surface thereof with a T-slot for the reception of T bolts for mounting the frame to the vehicle.

5. A windshield structure as set forth in claim 1 wherein the bottom of each said frame is formed with a laterally extending flange aperture to receive mounting screws.

6. A windshield structure as set forth in claim 1 further comprising a gasket of resilient material located between the pane of transparent material and the frame.

7. A windshield structure as set forth in claim 6 wherein the resilient material is vinyl foam.

8. In a method for manufacturing a boat windshield structure having at least one pane therein made solely of transparent material, the improvement comprising the step of placing the pane in a mold, molding a rigid plastic material in a U-shaped form directly on the entire perimeter of said pane, and simultaneously molding an opening in the frame for receiving a connecting member for connecting the rigid plastic material on said at least one pane to the boat or to adjacent rigid plastic material on another transparent pane.

9. In a method according to claim 8, wherein said windshield structure has a plurality of transparent panes therein, the improvement comprising the step of molding a rigid plastic material directly on the entire perimeter of each said pane, and connecting the plastic material of one frame to that of an adjacent frame to complete the said windshield structure.

* * * * *